(12) United States Patent
Tada et al.

(10) Patent No.: US 10,465,750 B2
(45) Date of Patent: Nov. 5, 2019

(54) SLIDING MEMBER, ROLLING BEARING, AND CAGE

(71) Applicant: NTN CORPORATION, Osaka (JP)

(72) Inventors: Masami Tada, Mie (JP); Yoji Sato, Mie (JP)

(73) Assignee: NTN CORPORATION, Osaka (JP)

( * ) Notice: Subject to any disclaimer, the term of this patent is extended or adjusted under 35 U.S.C. 154(b) by 0 days.

(21) Appl. No.: 15/116,470

(22) PCT Filed: Feb. 3, 2015

(86) PCT No.: PCT/JP2015/052917
§ 371 (c)(1),
(2) Date: Aug. 3, 2016

(87) PCT Pub. No.: WO2015/115655
PCT Pub. Date: Aug. 6, 2015

(65) Prior Publication Data
US 2016/0348723 A1    Dec. 1, 2016

(30) Foreign Application Priority Data

Feb. 3, 2014 (JP) .................................. 2014-018818
Mar. 24, 2014 (JP) .................................. 2014-060495
Mar. 24, 2014 (JP) .................................. 2014-060531

(51) Int. Cl.
*F16C 33/20* (2006.01)
*F16C 33/56* (2006.01)
(Continued)

(52) U.S. Cl.
CPC ............... *F16C 33/56* (2013.01); *B32B 1/08* (2013.01); *B32B 15/085* (2013.01); *B32B 15/18* (2013.01);
(Continued)

(58) Field of Classification Search
CPC .................................. C10M 3/00; C10M 7/00
(Continued)

(56) References Cited

U.S. PATENT DOCUMENTS

2004/0082701 A1* 4/2004 Ota ........................... C08F 8/00
524/474
2015/0307800 A1* 10/2015 Yoshida ................ F16C 33/201
508/106

FOREIGN PATENT DOCUMENTS

| CN | 1521211 A | 8/2004 |
| JP | 59-135274 A | 8/1984 |

(Continued)

OTHER PUBLICATIONS

International Search Report for PCT/JP2015/052917 dated Apr. 21, 2015.

(Continued)

*Primary Examiner* — Prem C Singh
*Assistant Examiner* — Francis C Campanell
(74) *Attorney, Agent, or Firm* — Hedman & Costigan, P.C.; James V. Costigan; Kathleen A. Costigan

(57) ABSTRACT

It is an object of the present invention to provide a sliding member, a rolling bearing, and a cage each having a sliding surface excellent in a sliding property thereof even in the presence of lubricating oil and under conditions of a high sliding speed and a high contact pressure. The sliding member is used under an oil lubrication environment and has a sliding layer formed on an iron-based metal material. The sliding layer consists of a foundation layer including heat-resistant resin and a first fluororesin layer both formed on a surface of the iron-based metal material. A second fluororesin layer is formed on a surface of the foundation layer. After the foundation layer and the second fluororesin layer are calcined, the second fluororesin layer is irradiated with radiation rays. The heat-resistant resin does not ther- (Continued)

mally decompose when the foundation layer and the second fluororesin layer are calcined.

10 Claims, 11 Drawing Sheets

(51) Int. Cl.
  *B32B 15/085* (2006.01)
  *B32B 15/18* (2006.01)
  *B32B 27/08* (2006.01)
  *B32B 27/32* (2006.01)
  *B32B 1/08* (2006.01)
  *F16C 33/46* (2006.01)
  *F16C 19/46* (2006.01)
  *F16C 9/02* (2006.01)

(52) U.S. Cl.
  CPC ............ *B32B 27/08* (2013.01); *B32B 27/322* (2013.01); *F16C 33/201* (2013.01); *F16C 33/206* (2013.01); *F16C 33/4611* (2013.01); *B32B 2307/554* (2013.01); *B32B 2307/584* (2013.01); *F16C 9/02* (2013.01); *F16C 19/463* (2013.01); *F16C 2202/04* (2013.01); *F16C 2202/20* (2013.01); *F16C 2208/32* (2013.01); *F16C 2240/06* (2013.01); *F16C 2240/26* (2013.01); *F16C 2240/60* (2013.01); *F16C 2326/10* (2013.01); *F16C 2360/22* (2013.01)

(58) Field of Classification Search
  USPC .................................................. 508/100, 106
  See application file for complete search history.

(56) References Cited

FOREIGN PATENT DOCUMENTS

| | | |
|---|---|---|
| JP | 06-115000 A | 4/1994 |
| JP | 09-052070 A | 2/1997 |
| JP | H09-278907 A | 10/1997 |
| JP | 10-009257 A | 1/1998 |
| JP | 10-009270 A | 1/1998 |
| JP | 10-103339 A | 4/1998 |
| JP | 11-035926 A | 2/1999 |
| JP | 2002-114883 A | 4/2002 |
| JP | 2002-225204 A | 8/2002 |
| JP | 2003-119293 A | 4/2003 |
| JP | 2005-105057 A | 4/2005 |
| JP | 2005-335184 A | 12/2005 |
| JP | 2005-335185 A | 12/2005 |
| JP | 2006-225649 A | 8/2006 |
| JP | 2007-067199 A | 3/2007 |
| JP | 2007-123733 A | 5/2007 |
| JP | 2008-069280 A | 3/2008 |
| JP | 2010-155443 A | 7/2010 |
| JP | 2010-270780 A | 12/2010 |
| JP | 2011-075021 A | 4/2011 |
| JP | 2012-036940 A | 2/2012 |
| JP | 2013-027875 A | 2/2013 |
| JP | 5189427 B2 | 4/2013 |
| JP | 2014-046673 A | 3/2014 |
| WO | 2013/042239 A1 | 3/2013 |

OTHER PUBLICATIONS

Beate Fuchs and Ulrich Scheler, Branching and Cross-Linking in Radiation-Modified Poly (tetrafluoroethylene): A Solid-State NMR Investigation, Macromolecules, 2000, pp. 120-124, vol. 33.
English Abstract for CN 1521211 A dated Aug. 18, 2004.
English Abstract for JP 2006-225649 A dated Aug. 31, 2006.
English Abstract for JP 11-035926 A dated Feb. 9, 1999.
English Abstract for JP 2007-067199 A dated Mar. 15, 2007.
English Abstract for JP 2007-123733 A dated May 17, 2007.
English Abstract for JP 10-103339 A dated Apr. 21, 1998.
English Abstract for JP 10-009257 A dated Jan. 13, 1998.
English Abstract for JP 2013-027875 A dated Feb. 7, 2013.
English Abstract for JP 06-115000 A dated Apr. 26, 1994.
English Abstract for JP 59-135274 A dated Aug. 3, 1984.
English Abstract for JP 09-052070 A dated Feb. 25, 1997.
English Abstract for JP 10-009270 A dated Jan. 13, 1998.
English Abstract for JP 2005-335185 A dated Dec. 8, 2005.
English Abstract for JP 2014-046673 A dated Mar. 17, 2014.
English Abstract for JP 2003-119293 A dated Apr. 23, 2003.
English Abstract for JP 2005-105057 A dated Apr. 21, 2005.
English Abstract for JP 2008-069280 A dated Mar. 27, 2008.
English Abstract for JP 2012-036940 A dated Feb. 23, 2012.
English Abstract for JP 2010-270780 A dated Dec. 2, 2010.

* cited by examiner

| State of wear mark after test finished ||
|---|---|
| Untreated specimen (one hour) | Untreated specimen (10 hours) |
|  |  |

SLIDING MEMBER, ROLLING BEARING, AND CAGE

TECHNICAL FIELD

The present invention relates to sliding member, a rolling bearing, and a cage and more particularly to a sliding member whose surface is high in its wear resistance and which is capable of maintaining the high wear resistance for a long time, for example, a cage for the rolling bearing and the rolling bearing having the cage.

BACKGROUND ART

A sliding surface of the rolling bearing and that of the cage are supplied with lubricating oil or lubricating grease to decrease rolling friction or sliding friction. The sliding surface is subjected to surface treatment to improve the sliding property thereof. As a known surface treatment method, a fluorine-based resin film is formed on the sliding surface. For example, as a known method, a polytetrafluoroethylene film (hereinafter referred to as PTFE) formed on a sliding portion of a sliding member is irradiated with radiation rays having a dose of 50 to 250 kGy to enhance the wear resistance and adhesiveness of the sliding member to the base material (patent document 1).

In a known method of producing a modified fluororesin coating material, a film of fluororesin is formed on the surface of a base material, excellent in its heat resistance, which is composed of a material selected from among polyimide resin; a metal material such as copper, aluminum, alloys thereof; ceramics; and glass and thereafter the fluororesin film is irradiated with ionizing radiation at a temperature not less than the melting point of the fluororesin (patent document 2).

A sliding member, comprising fluororesin, which is used for a non-lubricated bearing, dynamic seal, and the like is known. The fluororesin is heated up to a temperature not less than its crystalline melting point and thereafter irradiated with ionizing radiation within a range of an irradiation dose of 1 kGy to 10 MGy under the absence of oxygen (patent document 3).

A rolling bearing, particularly a needle roller bearing having a cage is used in engines of cars, motor bicycles, and the like. To prevent the surface of the cage from being subjected to seizure, the surface thereof is silver-plated. The needle roller bearing having the cage is composed of a pressed metal cage which retains needle rollers at regular intervals. The entire surface of the cage is silver-plated (patent document 4).

PRIOR ART DOCUMENTS

Patent Documents

Patent document 1: Japanese Patent Application Laid-Open Publication No. 2010-155443
Patent document 2: Japanese Patent Application Laid-Open Publication No. 2002-225204
Patent document 3: Japanese Patent Application Laid-Open Publication No. H9-278907
Patent document 4: U.S. Pat. No. 5,189,427

SUMMARY OF THE INVENTION

Problem to be Solved by the Invention

But the production method disclosed in the patent document 1 was developed to enhance the adhesiveness of the sliding surface of the rolling bearing and that of the cage to the base material inconsideration of use in unlubricated and low contact pressure conditions. Thus it is difficult to use the production method in the presence of lubricating oil and in conditions of a high sliding speed and a high contact pressure, although these conditions are satisfied for sliding surfaces of various machines.

The fluorine resin film described in the patent document 2 is intended to simultaneously bring about a crosslinking reaction of the fluororesin and a chemical reaction between the fluororesin and the surface of the base material to thereby achieve firm adhesiveness therebetween. The fluororesin film has a problem that in the case of an iron base material of the rolling bearing and the cage, it is difficult to bring about the chemical reaction between the fluororesin and the surface of the base material and thus impossible to achieve firm adhesiveness therebetween.

The sliding member described in the patent document 3 is used for an unlubricated bearing, a dynamic seal, and the like and it relates not to the configuration of a film, but to the sliding member composed of the fluororesin. Therefore its property as a coating material is unclear and further it is difficult to apply the sliding member to a rolling bearing required to be used in the presence of lubricating oil and at a high sliding speed and at a high contact pressure.

In the silver-plated cage described in the patent document 4, there is a demand for the development of the cage whose sliding surface has a small change with time in its wear amount. Thus a sliding material which substitutes silver plating is demanded. The silver plating has a problem that the silver plating is sulfurized by a sulfur component contained in engine oil. When the silver plated layer formed on the surface of the cage is sulfurized, the silver plated layer peels off or drops off the surface of the cage. As a result, the basis material of the cage is exposed.

The present invention has been made to deal with the above-described problems. Therefore it is an object of the present invention to provide a sliding member, a rolling bearing, and a cage each having a sliding surface excellent in a sliding property thereof even in the presence of lubricating oil and under conditions of a high sliding speed and a high contact pressure.

Means for Solving the Problem

The sliding member of the present invention is used under an oil lubrication environment and has a sliding layer formed on an iron-based metal material. The sliding layer is made by forming a foundation layer comprising heat-resistant resin and a first fluororesin on a surface of the iron-based metal material, forming a second fluororesin layer on a surface of the foundation layer, and after the foundation layer and the second fluororesin layer are calcined, irradiating with radiation rays the second fluororesin layer. The heat-resistant resin does not thermally decompose when the foundation layer and the second fluororesin layer are calcined. The second fluororesin layer is irradiated with the radiation rays in a condition in which the second fluororesin layer is crosslinked.

As a condition in which the second fluororesin layer of the sliding member is crosslinked, an irradiation temperature is in a range from a temperature lower than the melting point of the second fluororesin layer by 30° C. to a temperature higher than the melting point thereof by 20° C.; and an irradiation dose is more than 250 kGy and not more than 750 kGy. The radiation rays are electron beams. The second fluororesin is polytetrafluoroethylene resin. The second fluororesin, as compared with uncrosslinked polytetrafluoroethylene resin, shows a solid $^{19}$F Magic Angle Spinning (MAS) Nuclear Magnetic Resonance (NMR) chart where in addition to −82 ppm, −122 ppm, −126 ppm of the uncrosslinked polytetrafluoroethylene resin, at least one chemical shift value (δ ppm) selected from among −68 ppm, −70 ppm, −77 ppm, −80 ppm, −109 ppm, −112 ppm, −152 ppm, and −186 ppm appears or a signal intensity of a signal of a chemical shift value appearing at −82 ppm is higher than a signal intensity of the uncrosslinked polytetrafluoroethylene resin. The thickness of the sliding layer is not less than 10 μm and less than 40 μm.

The cage of the present invention made of an iron-based metal material retains rolling elements of a rolling bearing. The cage made of the iron-based metal material is formed of the sliding member of the present invention.

An indentation hardness of a sliding layer forming the surface of the cage made of the iron-based metal material after the sliding layer is irradiated with radiation rays is 52 to 90 MPa when the indentation hardness is measured in conformity to ISO14577.

In other sliding layer forming the surface of the cage made of the iron-based metal material, a melting point of second fluororesin layer irradiated with radiation rays is 265 to 310° C.

The rolling bearing of the present invention has the cage made of the iron-based metal material. The rolling bearing is used as a rolling bearing for a bid end portion of a connecting rod of an engine, a rolling bearing for a small end portion of the connecting rod thereof or a rolling bearing for a crankshaft-supporting shaft.

Effect of the Invention

The sliding member of the present invention has the sliding layer formed on the iron-based metal material. The sliding layer is composed of the foundation layer and the fluororesin layer. After the fluororesin layer is calcined, the fluororesin layer is crosslinked in the crosslinking condition. Therefore it is possible to restrain the fluororesin layer from wearing even in the presence of lubricating oil and under conditions of a high sliding speed and a high contact pressure and thus maintain the life of sliding parts and that of the bearing for a long time. The cage which is made of the iron-based metal material and has the sliding member formed thereon shows a sliding property equal to or higher than that of the cage having the silver-plated layer formed on its surface. The roller bearing having the cage made of the iron-based metal material is excellent in its sliding property. Thus the roller bearing can be used for a connecting rod to be used in the lubricating oil.

MODE FOR CARRYING OUT THE INVENTION

Figure 1:
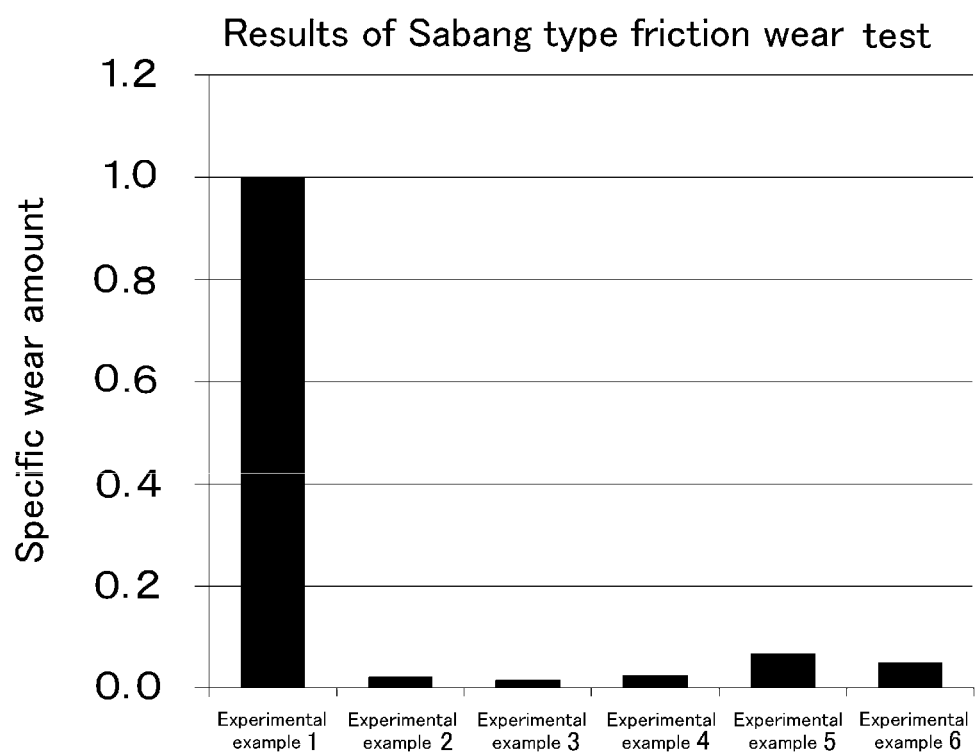
FIG. 1 shows the result of a Sabang type friction wear test.

The sliding member of the present invention has a sliding layer formed on an iron-based metal material. The sliding layer is composed of the foundation layer and a crosslinked fluororesin layer formed on the surface of the foundation layer.

As the iron-based metal material, bearing steel, carburized steel, carbon steel for mechanical structure, cold rolled steel, and hot rolled steel are listed. After the iron-based metal material is processed into the configuration of the sliding member, the iron-based metal material is quenched and tempered to adjust its surface hardness to a predetermined one. In the case of a cage made of the iron-based metal material consisting of chrome-molybdenum steel (SCM415), it is preferable to use the iron-based metal material adjusted to 484 to 595 in its Hv value.

The sliding layer is composed of the foundation layer formed on the surface of the iron-based metal material and the crosslinked fluororesin layer formed on the surface of the foundation layer.

The foundation layer is a mixture layer containing heat-resistant resin and first fluororesin and improves the adhesiveness between the iron-based metal material and the crosslinked fluororesin layer.

The heat-resistant resin does not pyrolytically decompose when the foundation layer and an upper layer film are calcined. That the heat-resistant resin does not pyrolytically decompose means that the heat-resistant resin does not start pyrolytic decomposition at temperatures at which the foundation layer and the upper layer film are calcined and within a period of time in which the foundation layer and the upper layer film are calcined. It is preferable that the heat-resistant resin has a functional group excellent in the adhesiveness between the heat-resistant resin and the iron-based metal material and a functional group which reacts with the first fluororesin in its molecular backbone or at its molecular end.

As the heat-resistant resin, epoxy resin, polyester resin, amide-imide resin, imide resin, ether imide resin, imidazole resin, polyethersulfone resin, polysulfone resin, polyether ether ketone resin, and silicone resin are listed. It is possible to use urethane resin and acrylic resin which prevent fluororesin from contracting in forming the film in combination with the above-described heat-resistant resin.

It is possible to use resin capable of dispersing in a water-based coating solution forming the foundation layer in a particulate form. As the first fluororesin, it is possible to preferably use PTFE particles, tetrafluoroethylene-perfluoro (alkyl vinyl ether) copolymer (hereinafter referred to as PFA) particles, tetrafluoroethylene-hexafluoropropylene copolymer (hereinafter referred to as FEP) particles, and a mixture of two or more kinds of these first fluororesins.

In addition to the heat-resistant resin and the first fluororesin, a nonionic surface active agent such as polyoxyethylene alkyl ether, an inorganic pigment such as carbon black, an aprotic solar solvent such as N-methyl-2-pyrrolidone which mixes with water arbitrarily, and water serving as a prime solvent are added to the water-based coating solution forming the foundation layer. It is possible to add a defoamer, a desiccant, a thickener, a leveling agent, and a cissing inhibitor to the water-based coating solution forming the foundation layer. As the water-based coating solution forming the foundation layer, primer paint EK series and ED series produced by DAIKIN INDUSTRIES, LTD. are exemplified.

The second fluororesin layer is formed on the surface of the foundation layer and can be crosslinked with radiation rays. Although the first and second fluororesin layers may be identical to each other or different from each other, it is preferable to use the identical fluororesin. As the second fluororesin layer, PTFE, PFA, FEP, ethylene, and a tetrafluoroethylene copolymer (ETFE) are listed. These resins can be used singly or as a mixture. Of these resins, the PTFE excellent in its heat resistance and sliding property is preferable.

The second fluororesin layer is obtained by applying an aqueous dispersion solution in which PTFE resin particles are dispersed to the foundation layer and drying the aqueous dispersion solution. As the aqueous dispersion solution in which the PTFE resin particles are dispersed, polyflon= PTFE enamel produced by DAIKIN INDUSTRIES, LTD. is exemplified.

The method of forming the sliding layer on the surface of the iron-based metal material is described below.

(1) Surface Treatment of Iron-Based Metal Material

It is preferable to adjust the surface roughness (Ra) of the iron-based metal material to 1.0 to 2.0 µm in advance by using shot blast or the like before the sliding layer is formed on the iron-based metal material and thereafter immerse the iron-based metal material in an organic solvent such as petroleum benzine to ultrasonically remove grease for five minutes to one hour.

(2) Application of Water-Based Coating Solution Forming Foundation Layer to Iron-Based Metal Material To improve the dispersibility of an aqueous dispersion solution, before applying the water-based coating solution forming the foundation layer to the iron-based metal material, a ball mill is used to re-disperse the water-based coating solution by rotating the ball mil at 40 rpm for one hour. The re-dispersed water-based coating solution is filtered by using a 100-mesh metallic wire. Thereafter the filtered water-based coating solution is applied to the iron-based metal material by using a spray method.

(3) Drying of Water-Based Coating Solution Forming Foundation Layer

After the water-based coating solution is applied to the iron-based metal material, the water-based coating solution is dried. As a drying condition, it is preferable to dry the water-based coating solution inside a thermostatic bath where temperature was set to 90° C. for about 30 minutes. The thickness of the dried foundation layer is set to 2.5 to 20 µm, favorably 5 to 20 µm, and more favorably 10 to 15 µm. In the case where the thickness of the dried foundation layer is less than 2.5 µm, there is a fear that the metal base material is exposed owing to peeling of the film off the metal base material caused by poor adhesiveness of the film to the metal base material and initial wear of the film. In the case where the thickness of the dried foundation layer is not less than 20 µm, there is a fear that a lubrication state deteriorates owing to the occurrence of crack during the formation of the film and the peeling of the film off the metal base material during an operation. By setting the thickness of the dried foundation layer to 2.5 to 20 µm, it is possible to prevent the metal base material from being exposed by the initial wear of the film and thus the film from peeling off the metal base material for a long time during the operation.

(4) Application of Water-Based Coating Solution Forming Second Fluororesin Layer to Iron-Based Metal Material To improve the dispersibility of the aqueous dispersion solution, before applying the water-based coating solution forming the second fluororesin layer to the iron-based metal material, the ball mill is used to re-disperse the water-based coating solution by rotating the ball mil at 40 rpm for one hour. The re-dispersed water-based coating solution is filtered by using the 100-mesh metallic wire. Thereafter the filtered water-based coating solution is applied to the foundation layer by using the spray method.

(5) Drying of Water-Based Coating Solution Forming Second Fluororesin Layer

After the water-based coating solution is applied to the foundation layer, the water-based coating solution is dried. As a drying condition, it is preferable to dry the water-based coating solution inside a thermostatic bath where temperature was set to 90° C. for about 30 minutes. The thickness of the dried second fluororesin layer is set to 2.5 to 20 µm, favorably 5 to 20 µm, and more favorably 10 to 15 µm. In the case where the thickness of the dried second fluororesin layer is less than 2.5 µm, there is a fear that the metal base material is exposed owing to peeling of the film off the metal base material caused by poor adhesiveness of the film to the metal base material and initial wear of the film. In the case where the thickness of the dried second fluororesin layer is not less than 20 µm, there is a fear that a lubrication state deteriorates owing to the generation of crack in forming the film and the peeling of the film off the metal base material in operation. By setting the thickness of the dried second fluororesin layer to 2.5 to 20 µm, it is possible to prevent the metal base material from being exposed by the initial wear of the film and thus the film from peeling of the film off the metal base material for a long time during the operation.

As a method of applying the water-based coating solution forming the foundation layer to the iron-based metal material and a method of applying the water-based coating solution forming the second fluororesin layer to the foundation layer, it is possible to use methods such as a dipping method and a brush painting method, provided that the methods are capable of forming the films in addition to the spraying method. The spraying method is preferable because the spraying method is capable of decreasing the surface roughness of the film and the configuration of the films to be formed by the application of the water-based coating solution to a high extent and making the thickness of each layer uniform.

(6) Calcination

After the second fluororesin layer is dried, it is calcined in the air inside a heating furnace at a temperature not less than the melting point of the second fluororesin layer, preferably in a range from (melting point (Tm)+30° C.) to (melting point (Tm)+100° C.) for 5 to 40 minutes. In the case where the first fluororesin layer and the second fluororesin layer are both PTFE, it is preferable to calcine the second fluororesin layer for 30 minutes in the heating furnace set to 380° C.

(7) Crosslinking of Second Fluororesin Layer

The fluororesin layer is crosslinked by irradiating the calcined film at an irradiation temperature in a range from a temperature lower than the melting point of the second fluororesin layer by 30° C. to a temperature higher than the melting point thereof by 20° C. and favorably in a condition where an irradiation dose is more than 250 kGy and not more than 750 kGy. As the radiation rays, it is possible to use particle beams such as α rays (particle beam of nucleus of helium-4 discharged from radionuclide which performs a collapse), β rays (negative and positive electrons discharged from nucleus), and electron beams (having almost constant kinetic energy; created by accelerating thermal electron); and ionizing radiation rays such as γ rays (electromagnetic wave having a short wavelength emitted and absorbed by transitions of atomic nucleus and elementary particles between energy levels and by pair annihilation and pair production of elementary particles). Of these radiation rays, the electron beams and the γ rays are favorable from the standpoint of the crosslinking efficiency and operability thereof. The electron beams are more favorable. The electron beams have advantages that in using the electron beams, it is easy to obtain an electron beam irradiation apparatus, easy to perform an irradiation operation, and possible to adopt continuous irradiation processes.

At irradiation temperatures other than the range from the temperature lower than the melting point of the second fluororesin layer by 30° C. to the temperature higher than the melting point thereof by 20° C., the crosslinking of the fluororesin layer does not fully proceed. Further an increase in the hardness of the fluororesin layer does not fully proceed. To efficiently crosslink the fluororesin layer, as an irradiation atmosphere, it is necessary to lower the oxygen concentration of an irradiation region by means of vacuuming or the injection of an inert gas into the irradiation region. It is preferable to set the range of the oxygen concentration to 0 to 300 ppm. To maintain the oxygen concentration in the above-described concentration range, the inert atmosphere formed by the means of the injection of the nitrogen gas into the irradiation region is preferable from the standpoint of operability and the cost.

In the case where an irradiation dose is not more than 250 kGy, the fluororesin layer is insufficiently crosslinked. Consequently the sliding surface of the sliding layer of the sliding layer wears in a large amount. As a result, there is a case in which the metal base plate may be exposed. In the case where the irradiation dose is not less than 1000 kGy, the crosslinking proceeds more than a necessary extent. Consequently the film has a high hardness and brittles. As a result, there is a case in which the film is liable to be subjected to damage such as peeling thereof off the foundation layer. The upper limit of the irradiation dose is favorably not more than 900 kGy and more favorably not more than 750 kGy.

By crosslinking the fluororesin layer at the irradiation temperature in the range from the temperature lower than the melting point of the second fluororesin layer by 30° C. to the temperature higher than the melting point thereof by 20° C. and at the irradiation dose more than 250 kGy and not more than 750 kGy, it is possible to adjust the surface hardness of the sliding layer indicated by an indentation hardness to 52 to 90 MPa, preferably 60 to 85 MPa. In the case where the indentation hardness is lower than 52 MPa, the wear amount of the sliding surface of the sliding layer is large. Consequently there is a case in which the metal base material may be exposed. In the case where the indentation hardness is higher than 90 MPa, the film has a high hardness and brittles. Consequently there is a case in which the film is liable to be subjected to damage such as peeling thereof off the foundation layer.

By crosslinking the fluororesin layer at the irradiation temperature in the range from the temperature lower than the melting point of the second fluororesin layer by 30° C. to the temperature higher than the melting point thereof by 20° C. and at the irradiation dose more than 250 kGy and not more than 750 kGy, it is possible to lower the melting point of the second fluororesin layer down to 265 to 310° C., preferably 272 to 301° C. In the case where the melting point of the second fluororesin layer is higher than 310° C., the wear amount of the sliding surface of the sliding layer is large. Consequently there is a case in which the metal base material is exposed. In the case where the melting point of the second fluororesin layer is lower than 265° C., the film has a high hardness and brittles. Consequently there is a case in which the film is liable to be subjected to damage such as peeling thereof off the foundation layer.

The thickness of the sliding layer obtained by carrying out the above-described method is not less than 5 μm and less than 40 μm, preferably not less than 15 μm and less than 30 μm. In the case where the thickness of the sliding layer is less than 5 μm, there is a fear that the metal base material is exposed owing to peeling of the film off the foundation layer caused by poor adhesiveness of the film to the foundation layer and owing to initial wear of the film. In the case where the thickness of the sliding layer is not less than 40 μm, there is a fear that a lubrication state deteriorates owing to the occurrence of crack in forming the film and owing to the peeling of the film off the foundation layer in operation. By setting the thickness of the sliding layer to not less than 5 μm and less than 40 μm, it is possible to prevent the metal base material from being exposed owing to the initial wear of the film and the peeling of the film off the foundation layer in operation.

To evaluate the wear resistance of the sliding layer obtained by carrying out the above-described method in the air, the wear amount thereof was measured in a Sabang type friction wear test. Test conditions of specimens and mating members are shown below.

(1) Preparation of Specimen

Specimen: A sliding layer was formed on a metal flat plate made of SPCC whose size was 30 mm×30 mm×2 mm (thickness). As a foundation layer, primer paint (model number: EK-1909S21R) produced by DAIKIN INDUSTRIES, LTD. was used. As a second fluororesin layer, top paint (model number: EK-3700C21R) produced by DAIKIN INDUSTRIES, LTD. was used. Both paints were dried in a thermostatic bath where temperature was set to 90° C. for 30 minutes and calcined in a heating furnace where temperature was set to 380° C. for 30 minutes.

Thereafter the specimens were irradiated with electron beams from a sliding layer side in the following conditions.

Apparatus used: EPS-3000 produced by NHV Corporation.

Accelerating voltage: 1.16 MeV

Irradiation dose: 0 kGy (unirradiated) in an experimental example 1, 85 kGy in an experimental example 2, 250 kGy in an experimental example 3, 500 kGy in an experimental example 4, 750 kGy in an experimental example 5, and 1000 kGy in an experimental example 6.

Dose rate: 3.9 kGy/s in the experimental example 2, and 6.1 kGy/s in the experimental examples 3, 4, 5, and 6

Speed of conveyor: 3 m/minute in the experimental example 2, 2 m/minute in the experimental examples 3 and 5, 1 m/minute in the experimental examples 4 and 6.

Temperature of film at irradiation time: 310° C.

Atmosphere inside chamber at irradiation time: heated nitrogen

Electron current: 8.1 mA in the experimental example 2, 12.7 mA in the experimental example 3, 4, 5, and 6.

Irradiation width (in movement direction of conveyor): 27.5 cm (2) Films of Specimens of Experimental Examples Experimental Example 1

PTFE film (irradiation dose: 0 kGy, layer thickness: 20 μm)

Experimental Example 2

PTFE film (irradiation dose: 85 kGy, layer thickness: 20 μm)

Experimental Example 3

PTFE film (irradiation dose: 250 kGy, layer thickness: 20 μm)

Experimental Example 4

PTFE film (irradiation dose: 500 kGy, layer thickness: 20 μm)

Experimental Example 5

PTFE film (irradiation dose: 750 kGy, layer thickness: 20 μm)

Experimental Example 6

PTFE film (irradiation dose: 1000 kGy, layer thickness: 20 μm)

(3) Condition of Sabang Type Friction Wear Test

Mating member: A quenched and tempered ring made of SUJ2 having φ 40 mm×10 mm (width) and a subsidiary curvature of R60 mm Lubricating oil: not used Sliding speed: 0.05 m/s Load: 50N Sliding period of time: The test was conducted continuously for five minutes in the experimental example 1, and continuously for 60 minutes in the experimental examples 2, 3, 4, 5, and 6.

Lubrication state: not lubricated (4) Results of Test

FIG. 1 shows test results. The specific wear rate is a value obtained by dividing a wear volume by the addition of a sliding distance and a load. The wear volume was calculated from a minor axis of a formed wear mark and the shape dimension of the mating member (φ 40 mm and R60 mm). FIG. 1 shows ratios of the specimens of the experimental example 2 through 6 with respect to the specific wear rate of the specimen of the experimental example 1 set to 1.0.

As shown in FIG. 1, the specific wear rates of the specimens of the experimental examples 2, 3, 4, 5, and 6 showed lower specific wear rates than that of the specimen of the experimental example 1 not irradiated with electron beam.

To evaluate the wear resistance of the sliding layer obtained by carrying out the above-described method in the presence of grease, the Sabang type friction wear test was conducted to measure the wear amount of the specimen of the experimental example 4 under grease lubrication in following conditions. As a comparison, a test was conducted in the same conditions on an untreated specimen consisting of a metal flat plate made of SPCC whose size was length 30 mm, width 30 mm, and thickness 2 mm.

(5) Condition of Sabang Type Friction Wear Test Under Grease Lubrication

Mating member: A quenched and tempered ring made of SUJ2 having φ 40 mm×10 mm (width) and a subsidiary curvature of R60 mm Kind of lubricant: grease (UnimaxR2 produced by KYODO YUSHI CO., LTD.)

Amount of lubricant: 50 mg of lubricant was applied to the mating member (ring) by hand.

Sliding speed: 0.05 m/s

Load: 50N

Figure 10:
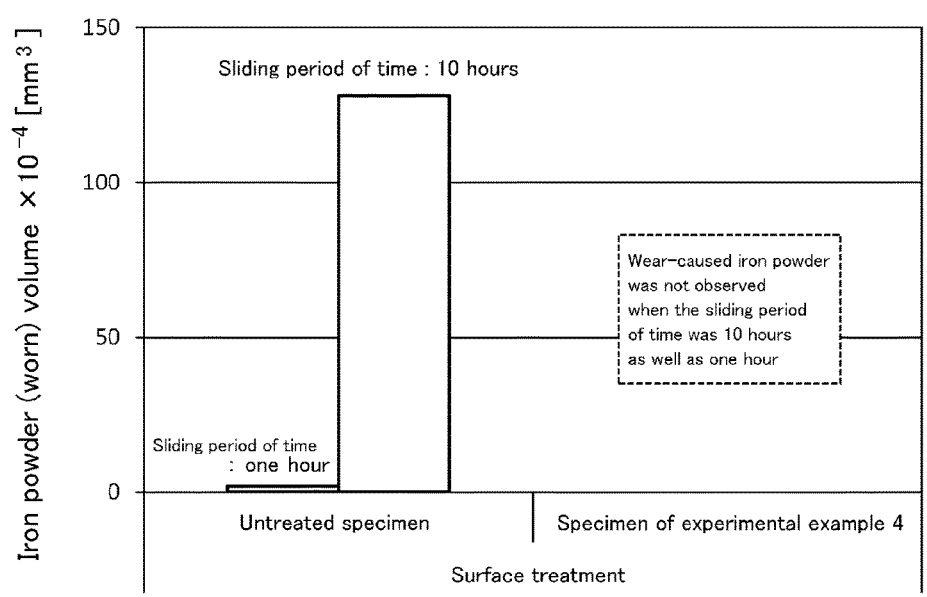
FIG. 10 shows results (grease lubrication) of a Sabang type friction wear test.
Figure 11:
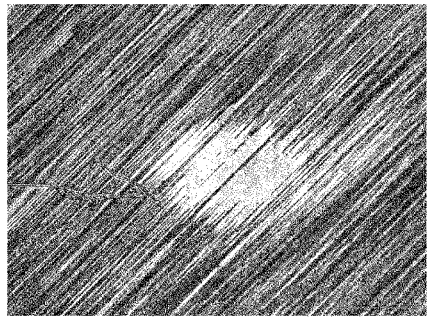
FIG. 11 is a photograph of the state of a wear mark after an untreated specimen was subjected to a test.
Figure 11:
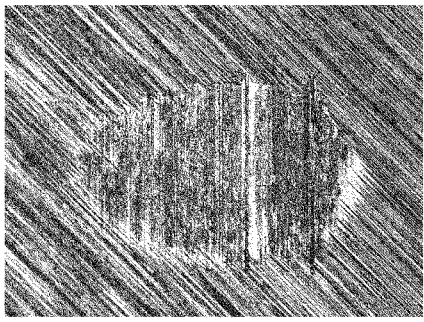

Sliding period of time: one hour or 10 hours (6) FIG. 10 shows test results. FIG. 11 shows a photograph of the state of a wear mark after the untreated specimen was subjected to the test. The wear volume was calculated from the minor axis of the formed wear mark and the shape dimension of the mating member (φ 40 mm and R60 mm).

As shown in FIG. 10, under the grease lubrication, the specimen of the experimental example 4 had a higher wear resistance than the untreated specimen not having a predetermined sliding layer. In the experimental example 4, wear-caused iron powder was not observed when the sliding period of time was 10 hours as well as one hour.

Description is made below on the fact that the second fluororesin layer of the sliding member has a crosslinked structure. Generally, since fluorine-based resin, particularly polytetrafluoroethylene resin is highly chemically stable and very stable for organic solvents, it is difficult to identify its molecular structure or molecular amount. The sliding member of the present invention has a three-dimensional structure formed by crosslinking the second fluororesin layer. Therefore it is difficult for the sliding member to dissolve in solvents. Thus it is very difficult to analyze its structure. But it is possible to identify the three-dimensional structure of the sliding member of the present invention by measurement and analysis made by using $^{19}F$ Magic Angle Spinning (MAS) Nuclear Magnetic Resonance (NMR) method (High speed magic angle nuclear magnetic resonance).

Figure 2:
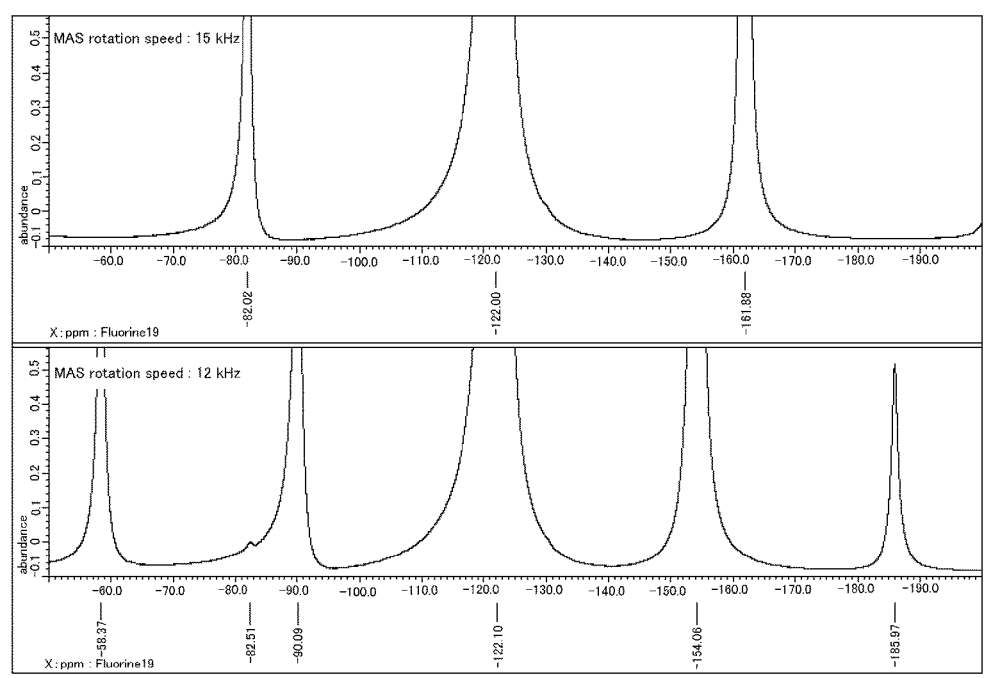
FIG. 2 is an enlarged view of an NMR chart of an experimental example 1.
Figure 3:
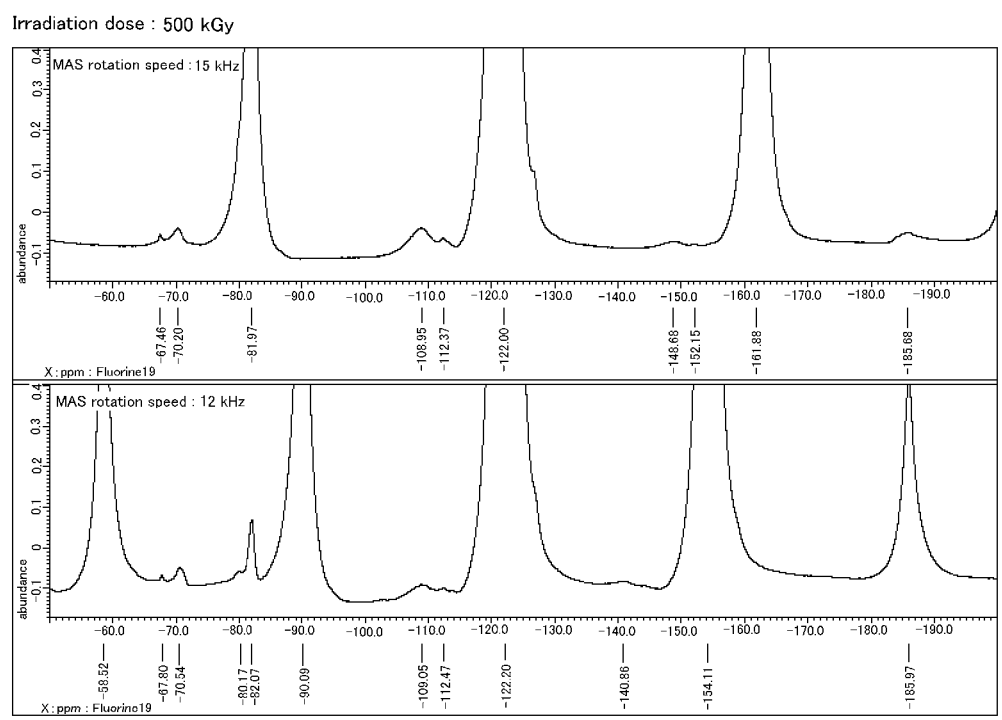
FIG. 3 is an enlarged view of an NMR chart of an experimental example 4.
Figure 4:
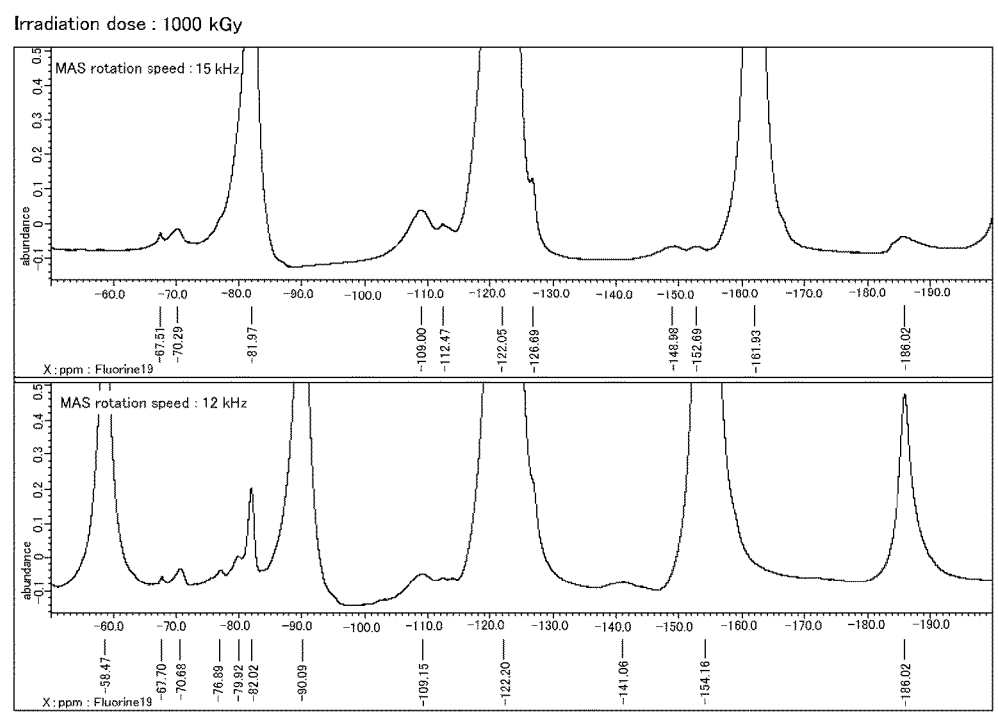
FIG. 4 is an enlarged view of an NMR chart of an experimental example 6.
Figure 5:
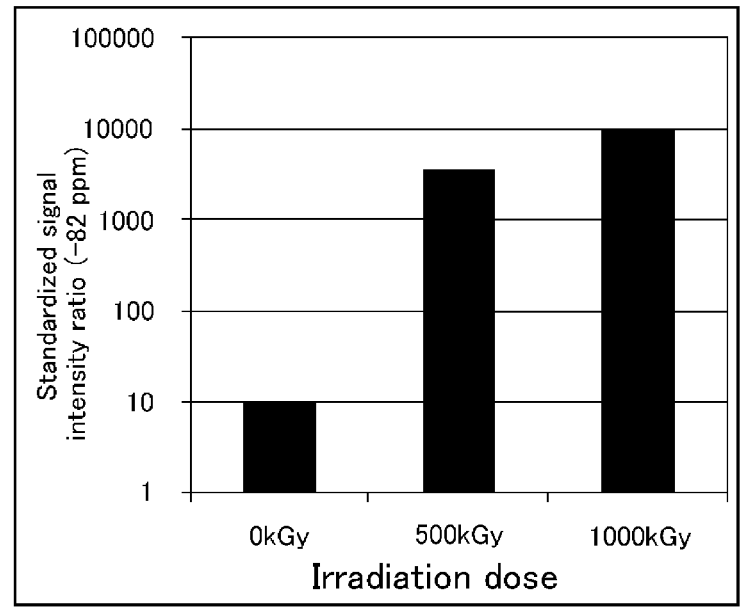
FIG. 5 shows a standardized signal intensity ratio at −82 ppm where a signal intensity increases as a result of crosslinking.

The measurement was conducted on a suitable nuclide $^{19}F$ to be measured by using an NMR apparatus JNM-ECX400 produced by JEOL LTD. under conditions where a resonant frequency was 376.2 MHz, a MAS (Magnetic Angle Spinning) rotational speed was 15 kHz and 12 kHz, the amount of a sample was about 70 μL in a 4 mm solid NMR tube, a waiting period of time (recycled delay time) was 10 seconds, and a measurement temperature was about 24° C. FIGS. 2 through 5 show the results. FIG. 2 shows an enlarged view of an NMR chart in the experimental example 1. FIG. 3 shows an enlarged view of an NMR chart in the experimental example 4. FIG. 4 shows an enlarged view of an NMR chart of the experimental example 6. In FIGS. 2 through 4, an upper step shows the MAS rotational speed 15 kHz, whereas a lower step shows the MAS rotational speed 12 kHz. FIG. 5 is a graph in which a signal intensity at −82 ppm where the signal intensity increases as a result of crosslinking is standardized by a signal intensity at −122 ppm which is a main signal. In FIG. 5, an upper step shows measured values, whereas a lower step shows a graph. It is conceivable that the higher the signal intensity ratio is, the higher the degree of crosslinking is.

The structure of the second fluororesin layer (experimental example 1, 0 kGy) not irradiated with radiation rays was measured in the above-described conditions. As a result, at the MAS rotational speed of 15 kHz, signals of −82 ppm, −122 ppm, and −162 ppm were observed (upper step in FIG. 2). At the MAS rotation speed of 12 kHz, signals of −58 ppm, −82 ppm, −90 ppm, −122 ppm, −154 ppm, and −186 ppm were observed (lower step in FIG. 2). It is known that −122 ppm is the signal of an F atom in a —$CF_2$—$CF_2$— bond and that −82 ppm is the signal of the F atom of —$CF_3$ in a —$CF_2$—$CF_3$— bond. From this, signals of −82 ppm and −162 ppm at the MAS rotational speed of 15 kHz and signals of −58 ppm, −90 ppm, −154 ppm, and −186 ppm at the MAS rotational speed of 12 kHz are Spinning Side Bands (SSB). Abroad signal hidden by the signal of −122 ppm is observed in a region from −122 ppm to −130 ppm. The broad signal is the signal of the F atom of —$CF_2$— in the —$CF_2$—$CF_3$— bond to be observed at −126 ppm. Therefore the uncrosslinked second fluororesin layer not irradiated with the radiation rays is expressed by an NMR chart having −122 ppm which is assigned to the —$CF_2$—$CF_2$— bond and −82 ppm and −126 ppm which is assigned to the —$CF_2$—$CF_3$— bond.

The structure of a solid $^{19}F$ MAS NMR of the second fluororesin layer (experimental example 4, 500 kGy), irradiated with the radiation rays, which has an irradiation dose of 500 kGy was measured in the same condition as that used for the uncrosslinked second fluororesin layer. As a result, except for the spinning side band, signals of −68 ppm, −70 ppm, −80 ppm, −82 ppm, −109 ppm, −112 ppm, −122 ppm, −126 ppm, −152 ppm, and −186 ppm were observed (upper and lower steps in FIG. 3). Signals of −68 ppm, −70 ppm, −80 ppm, −109 ppm, −112 ppm, −152 ppm, and −186 ppm newly appeared owing to the irradiation of the radiation rays. The intensity of the signal of −82 ppm was higher than that measured when the second fluororesin layer was not irradiated with the radiation rays.

The structure of a solid $^{19}F$ MAS NMR of the second fluororesin layer (experimental example 6, 1000 kGy), irradiated with the radiation rays, which has an irradiation dose of 1000 kGy was measured in the same condition as that used for the uncrosslinked second fluororesin layer. As a result, except for the spinning side band, signals of −68 ppm, −70 ppm, −77 ppm, −80 ppm, −82 ppm, −109 ppm, −112 ppm, −122 ppm, −126 ppm, −152 ppm, and −186 ppm were observed (upper and lower steps in FIG. 4). Signals of −68 ppm, −70 ppm, −77 ppm, −80 ppm, −109 ppm, −112 ppm, −152 ppm, and −186 ppm newly appeared owing to the irradiation of the radiation rays. The intensity of the signal of −82 ppm was higher than that measured when the second fluororesin layer was irradiated with the radiation rays having the irradiation dose of 500 kGy.

Expressing the F atom to which the above-described signals are assigned with an underline, it is known that −70 ppm is assigned to =CF—$\underline{CF}_3$; −109 ppm is assigned to —$CF_2$—$\underline{CF}(CF_3)$—$CF_2$—; −152 ppm is assigned to =CF—$\underline{CF}$=; and −186 ppm is assigned to $\equiv\underline{CF}$ (Beate Fuchs and Ulrich Scheler, Branching and Cross-Linking in Radiation-Modified Poly (tetrafluoroethylene): A Soli-State NMR Investigation. Macromolecules, 33, 120-124, the year two thousand).

These signals indicate that fluorine atoms chemically non-equivalent are present and that the second fluororesin layer is crosslinked to form the three-dimensional structure. According to the description of the above-described document, it is known that the intensity of an observed signal is higher at the irradiation dose of 1000 kGy than at the irradiation dose of 500 kGy and becomes higher with an increase of the irradiation dose up to the irradiation dose of 3000 kGy. Regarding signals not described in the above-described document, it is conceivable that the second fluororesin layer has different structures according to the difference in irradiation conditions. That the crosslinking structure is formed is evident from the fact that the structures of =CF—$CF_3$, —$CF_2$—$CF(CF_3)$—$CF_2$—, =CF—CF=, and $\equiv$CF are present.

As shown in FIG. 5, as the irradiation dose increases, the standardized signal intensity ratio increases. At the irradiation dose of 500 kGy, the crosslinking structure apparently appears. When the irradiation dose becomes twice as large as 500 kGy, namely, 1000 kGy, the standardized signal intensity ratio becomes three times as large as that observed when the irradiation dose is 500 kGy. Thus it has been found that the crosslinking proceeds to a further extent with an increase in the irradiation dose.

By irradiating the fluororesin layer with the radiation rays, the fluororesin is crosslinked, with the result that the surface hardness of the fluororesin layer increases. By so irradiating the fluororesin layer with the radiation rays that the indentation hardness of the film becomes 52 to 90 MPa, preferably 60 to 85 MPa, the fluororesin layer is allowed to have a high hardness. It is preferable to set the irradiation dose to 250 to 750 kGy. The surface hardness of the sliding layer can be adjusted by irradiating the fluororesin layer with the radiation rays in the range from 250 to 750 kGy in the irradiation dose.

When the indentation hardness is lower than 52 MPa as a result of the irradiation, the wear amount of the sliding surface of the sliding layer is large. Consequently there is a case in which the metal base material may be exposed. When the indentation hardness is higher than 90 MPa, the film has a high hardness and brittles. Consequently there is a case in which the film is liable to be subjected to damage such as peeling thereof off the metal base material.

By irradiating the fluororesin layer with the radiation rays, the fluororesin is crosslinked. Thereby the melting point of the fluororesin layer can be lowered. To allow the melting point of the fluororesin layer to be lowered to 265 to 310° C. and preferably 272 to 301° C., the calcine film is irradiated with the radiation rays at a temperature irradiation temperature in a range from a temperature lower by 30° C. than the melting point of the second fluororesin layer before the second fluororesin layer is irradiated with the radiation rays to a temperature higher the melting point thereof by 20° C. It is preferable to set the irradiation dose to 250 to 750 kGy. When the melting point is higher than 310° C. as a result of the irradiation, the wear amount of the sliding layer of the fluororesin layer is large. Consequently there is a case in which the metal base material may be exposed. When the melting point is lower than 265° C., the film has a high hardness and brittles. Consequently there is a case in which the film is liable to be subjected to damage such as peeling thereof off the metal base material.

In the iron-based metal material having the sliding layer formed thereon, the sliding layer has excellent adhesiveness to the iron-based metal material, and the sliding surface of the sliding layer has excellent wear resistance in the presence of oil. Thus the iron-based metal material can be suitably used for a cage and a rolling bearing having the cage made of the iron-based metal material. The iron-based metal material is especially suitable for a rolling bearing, having needle rollers serving as rolling elements, for a bid end portion of a connecting rod of an engine, a rolling bearing for a small end portion of the connecting rod or a rolling bearing for a crankshaft-supporting shaft.

Figure 6:
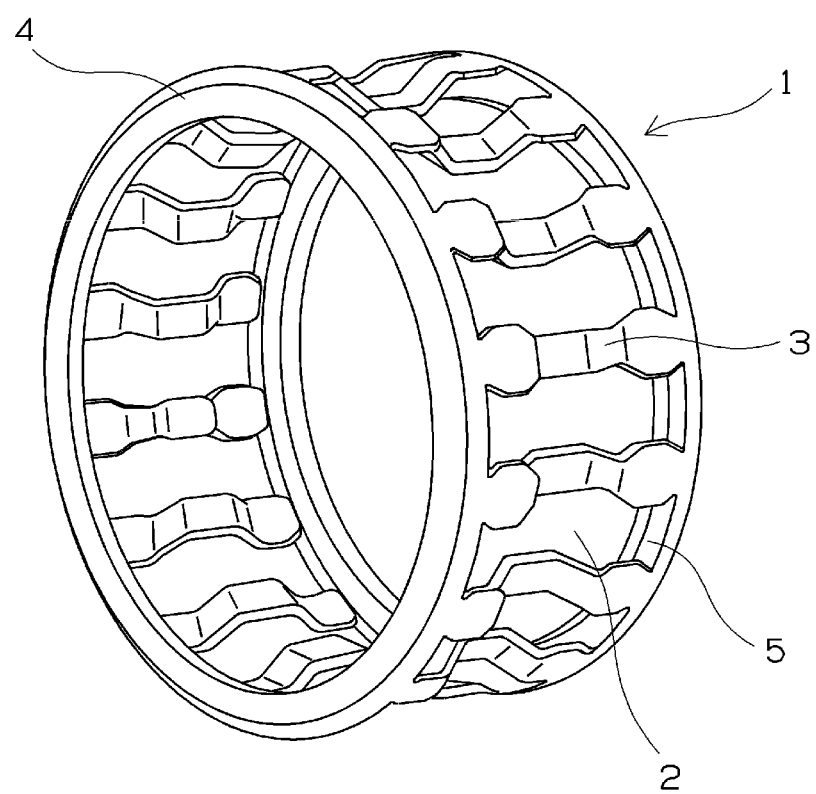
FIG. 6 is a perspective view of a cage for a rolling bearing in which needle rollers are used as rolling elements.

FIG. 6 shows the construction of a cage for a rolling bearing having the above-described sliding layer. FIG. 6 is a perspective view of the cage, made of the iron-based metal material, for the rolling bearing in which needle rollers are used as rolling elements.

A cage 1 has pockets 2 for holding the needle rollers. The interval between the needle rollers is retained by pillar parts 3 each positioned between the adjacent pockets and both-side annular portions 4, 5 fixing the pillar parts 3 thereto. To retain the needle rollers, each pillar part 3 is bent in mountain fold and valley fold at a central portion of the pillar part and has a complicated flat plate shape having a circular bulge in a planar view at portions of the pillar part 3 connected to the both-side annular portions 4, 5. As a method of producing the cage, it is possible to adopt a method of cutting out a circular ring from a formed and fabricated material and forming the pockets 2 by punch pressing and a method of forming a flat plate by press working, cutting it to a proper length, rolling a cut portion, and joining the cut portion by welding. The sliding layer of the fluororesin film is formed on the surface of the cage 1. The surface of the cage 1 on which the sliding layer is formed contacts lubricating oil or grease. It is preferable to form the sliding layer on the entire surface of the cage 1 including the surfaces of the pockets 2 which contact the needle rollers.

Figure 7:
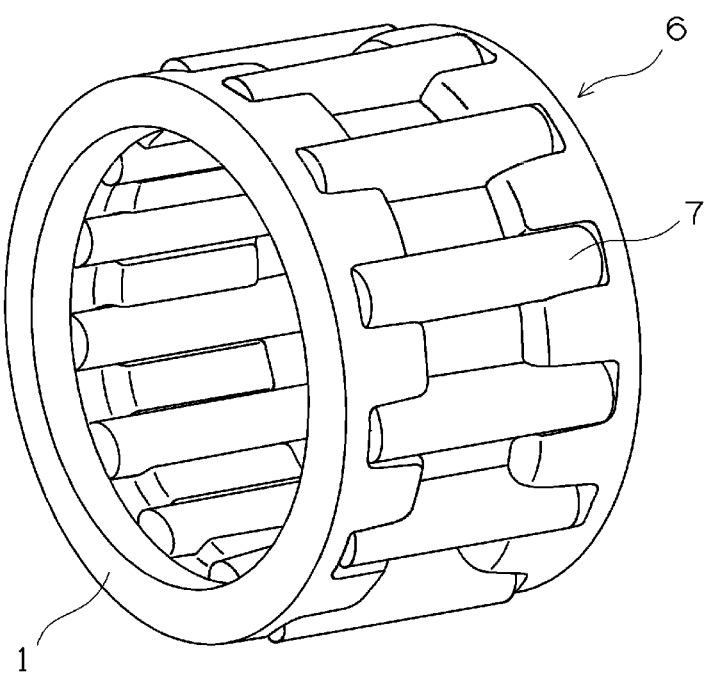
FIG. 7 is a perspective view showing a needle roller bearing.

FIG. 7 is a perspective view showing a needle roller bearing which is one example of the rolling bearing. As shown in FIG. 7, a needle roller bearing 6 is constructed of a plurality of needle rollers 7 and a cage 1 retaining the needle rollers 7 at regular intervals or irregular intervals. In the case of a bearing for a connecting rod part of an engine, the bearing is used by directly inserting shafts such as a crankshaft and a piston pin into the inner diameter side of the cage 1 and fitting the outer diameter side of the cage 1 into an engaging hole of the connecting rod which is a housing without providing the bearing with an inner ring and an outer ring. In the needle roller bearing 6 which does not have the inner and outer rings, the needle rollers 7 whose diameters are much smaller than its length are used as the rolling elements. Thus the needle roller bearing 6 is smaller than ordinary rolling bearings having the inner and outer rings.

Figure 8:
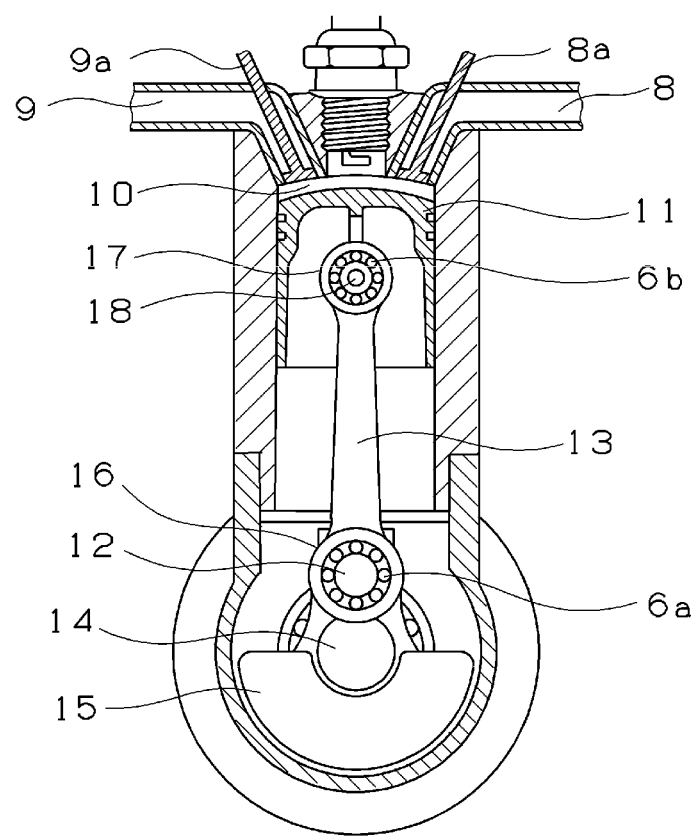
FIG. 8 is a vertical cross-sectional view of a four-cycle engine.

FIG. 8 shows a vertical cross-sectional view of a four-cycle engine using the above-described needle rolling bearing.

FIG. 8 is a vertical sectional view of the four-cycle engine using the needle rolling bearing as one example of the rolling bearing of the present invention. The four-cycle engine has a suction stroke in which an inlet valve 8a is opened and an exhaust valve 9a is closed to feed an air-gasoline mixture to a combustion chamber 10 through an inlet pipe 8, a compression stroke in which the inlet valve 8a is closed and a piston 11 is pressed upward to compress the mixture gas, a combustion stroke in which the compressed mixture gas is exploded, an exhaust stroke in which an exploded combustion gas is exhausted through an exhaust pipe 9 by opening the exhaust valve 9a. The four-cycle engine has a piston 11 making a linear reciprocating motion by the combustion of the mixture gas, a crankshaft 12 outputting a rotational motion, and a connecting rod 13 connecting the piston 11 and the crankshaft 12 to each other to convert the linear reciprocating motion to the rotational motion. The crankshaft 12 rotates on a rotational central axis 14 with a balance weight 15 taking a balance in the rotation of the crankshaft.

The connecting rod 13 has a big-end portion 16 at a lower portion of a straight rod and a small-end portion 17 at an upper portion thereof. The crankshaft 12 is rotatably supported via a needle roller bearing 6a mounted on an engaging hole of the big-end portion 16 of the connecting rod 13. A piston pin 18 coupling the piston 11 and the connecting rod 13 to each other is rotatably supported via a needle roller bearing 6b mounted on an engaging hole of the small-end portion 17 of the connecting rod 13.

By using the needle roller bearing excellent in its sliding property, two-cycle and four-cycle engines downsized or having a high output in which the needle roller bearing is used has excellent durability.

Although the needle roller bearing is exemplified as a bearing with reference to FIG. 7, in addition to the needle roller bearing, the rolling bearing of the present invention can be used as a cylindrical roller bearing, a tapered roller bearing, a self-aligning roller bearing, a needle roller bearing, a thrust cylindrical roller bearing, a thrust tapered roller bearing, a thrust needle roller bearing, a thrust self-aligning roller bearing. The rolling bearing of present invention can be used as preferably used as the rolling bearing, having the cage made of the iron-based metal material, which is used under an oil lubrication environment.

Because the iron-based metal material having the sliding layer having formed thereon is excellent in its wear resistance under the grease lubrication consisting of base oil and a thickener, the iron-based metal material can be preferably used for the cage composed of the iron-based metal material and the rolling bearing having the cage. The grease deteriorates owing to temperature rise of the bearing caused by heat generation during a high-speed rotation and owing to mixing of metal abrasion powder generated by friction between rolling elements and the cage both made of steel into the grease. On the other hand, as shown in FIG. 10, by forming the sliding layer on at least one of iron-based metal materials and the sliding layer which slides on the iron-based metal material, it is possible to restrain the amount (amount mixed into grease) of the metal abrasion powder from increasing with time. Consequently it is possible to restrain the grease from deteriorating and extend the lubrication life of the grease.

A bearing for a main motor of a railway vehicle is one example of a bearing to be lubricated with grease. In this bearing, a ball bearing is used as a bearing at a stationary side to cope with axial expansion and contraction of a main shaft caused by a temperature change, while as a bearing at a free side, a cylindrical roller bearing capable of coping with the expansion and contraction of the main shaft is used. As the bearing at the stationary side, a deep groove ball bearing is used. The deep groove ball bearing has steel balls and an iron plate-wave-type cage. The cylindrical bearing at the free side has a cylindrical roller made of steel and a machined brass cage. In the case where these bearings for the main motor are used at a high temperature and under a high-speed rotation, grease having lithium soap and mineral oil is used as a lubricant.

Because the lubrication life of the grease used in the bearing for the main motor of the railway vehicle is short relative to the rolling fatigue life of the bearing, in the present situation, a grease refilling work (maintenance) is carried out in an overhaul of vehicles to be carried out for each predetermined travel distance. In the present maintenance cycle, in many cases, the deterioration of the grease progress because of the above-described reason. By applying the rolling bearing of the present invention to the bearing for the main motor of the railway vehicle, it is possible to extend the lubrication life of the grease and the maintenance cycle.

EXAMPLES

Examples 1 Through 7 and Comparative Examples 1 Through 4

A cage (surface hardness of base material: Hv: 484 to 595), for a needle bearing, made of quenched and tempered chromium-molybdenum steel (SCM415) having a diameter of ϕ44 mm and a width of 22 mm was prepared. A coating liquid identical to that used to form the foundation layer and the second fluororesin layer used in the experimental example 1 was applied to an iron-based metal material in the same condition as that of the experimental example 1 to form, dry, and calcine a surface sliding layer consisting of PTFE except that the thickness of the coating layer was set to the thickness described in table 1. Using an electron beam irradiation apparatus used in the experimental example 1, the second fluororesin layer was irradiated with electron beams having an irradiation dose shown in table 1. Regarding the irradiation dose of the electron beams, the irradiation dose in the experimental example 1 and that in the example 2 were equal to each other, the irradiation dose in the example 2 and that in the experimental example 3 were equal to each other, the irradiation dose in the example 3 and that in the example 6 were equal to that of the experimental example 4, the irradiation dose in the example 4 and that in the experimental example 5 were equal to each other, the irradiation dose in the example 5 and that in the experimental example 6 were equal to each other, and the irradiation dose in the example 7 was set to 260 kGy. A specimen of the comparative example 1 as well as that of the experimental example 1 was not irradiated with the electron beams. In a specimen of a comparative example 2, crack occurred at the stage of calcining a sliding film. Thus the irradiation of the electron beams and the evaluation test were discontinued. In a comparative example 3, without forming the foundation layer, the second fluororesin layer was formed directly on the iron-based metal material by using a coating liquid identical to that of the experimental example 1 and in a condition identical to that of the experimental example 1 and thereafter the second fluororesin layer was irradiated with the electron beams having an irradiation dose identical to that of the experimental example 4. In a comparative example 4, a silver-plated layer was formed on the surface the cage of the needle bearing made of the quenched and tempered chromium-molybdenum steel (SCM415) having a diameter of ϕ 44 mm and a width of 22 mm.

Figure 9:
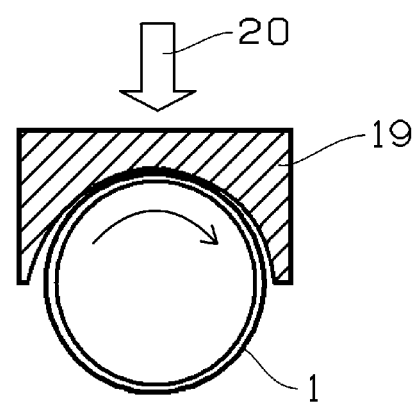
FIG. 9 shows the outline of a wear amount test apparatus.

The friction properties of surface-treated cages of the needle bearings were evaluated in the following method. FIG. 9 shows the outline of a wear amount testing apparatus.

With a quenched and tempered concave mating member 19 made of SUJ2 having a Rockwell Hardness of HRC62 and a surface roughness of 0.1 to 0.2 μmRa being pressed against a cage 1 mounted on a rotational shaft from a vertical direction, the cage 1 was rotated together with the rotational shaft to evaluate the friction property of a film formed on the surface of the cage 1 and measure the wear amount of the sliding surface of the film. The measuring conditions are as follows: load: 440N, lubricating oil: mineral oil (10W-30), sliding speed: 930.6 m/minute, and measured period of time: 100 hours. By visually observing peel-off amount of the film subjected to the above-described rotation of the cage, the adhesiveness of the PTFE film was evaluated. That the peel-off amount is "large" means that the peel-off area of a maximum peel-off portion is not less than 1 mm². That the peel-off amount is "small" means that the peel-off area of a maximum peel-off portion is less than 1 mm². The radius of a concave R part was set larger than the radius of the cage by 20 to 55 μm. The amount of the lubricating oil used was so set that the half of the height of cage was immersed in the lubricating oil. Table 1 shows the results.

Specimens to be immersed in lubricating oil were prepared. The specimens were subjected to a lubricating oil immersion test by carrying out the following method. Table 1 shows the results. The details of the test conditions, the specimens, and the measuring method are shown below.

After three square bars coated with a film respectively were immersed for 200 hours in 2.2 g of lubricating oil [1 wt % of ZnDTP (LUBRIZOL677A produced by LUBRIZOL Corporation was added to poly-α-olefin: Lucant HL-10 (produced by Mitsui Chemicals, Inc.) having a temperature of 150° C., the concentration (unit of elution amount, ppm) of a component of each film which eluted in the lubricating oil were measured. The concentration was quantified by using X-ray fluorescence measurement [X-ray fluorescence measuring apparatus: Rigaku ZSX 100e (produced by Rigaku Corporation). As specimens, three square bars (total of surface areas: 774=²) made of SCM415 and having a dimension of 3 mm×3 mm×20 mm were used in each experimental example.

TABLE 1

| | Example | | | | | | | Comparative example | | | |
|---|---|---|---|---|---|---|---|---|---|---|---|
| | 1 | 2 | 3 | 4 | 5 | 6 | 7 | 1 | 2 | 3 | 4 |
| Material of sliding layer | PTFE | PTFE | PTFE | PTFE | PTFE | PTFE | PTFE | PTFE | PTFE ※2) | PTFE | Silver plating |
| Irradiation dose, kGy | 85 | 250 | 500 | 750 | 1000 | 500 | 260 | 0 | — | 500 | — |
| Thickness of sliding layer, μm | 20 | 20 | 20 | 20 | 20 | 5 | 30 | 20 | 40 | 20 | 20 |
| Wear amount, μm n = 1 | 20 | 7 | 10 | 8 | 8 | 5 | 9 | 20 | Untestable | ※3) | 12 |
| n = 2 | 12 | 9 | 11 | 8 | ※1) | 5 | 10 | 20 | Untestable | ※3) | 11 |
| Peel-off amount n = 1 | Large | Small | Small | Small | Large | — | Small | — | Untestable | ※3) | Small |
| n - 2 | Large | Small | Small | Small | Large ※1) | — | Small | — | Untestable | ※3) | Small |
| Elution amount in immersion test, ppm | 0 | 0 | 0 | 0 | 0 | 0 | 0 | 0 | 0 | 0 | 600 |

※1 Because the peel-off amount was large in 20 hours, the test was discontinued. In terms of the peel-off amount, the peel-off area of the maximum peel-off portion was not less than 2 mm².
※2) Without forming the foundation layer, the second fluororesin layer consisting of PTFE was formed directly on the base material.
※3) Peeling occurred in the vicinity of the base material. Thus the test was discontinued.

Examples 8 Through 11 and Comparative Examples 5 Through 9

As specimens whose indentation hardness were to be measured, metal flat plates each made of SPCC whose size was length 30 mm, width 30 mm, and thickness 2 mm were prepared. In a cage rotation test, cages (surface hardness of base material: Hv: 484 to 595), for a needle bearing, made of quenched and tempered chromium-molybdenum steel (SCM415) having a diameter of ϕ 40 mm and a width of 22 mm were prepared. The surface of each specimen was so roughened by blast treatment that the surface thereof had a surface roughness of Ra1 μm. After the surface of each specimen was washed, a sliding layer was formed by using primer paint (model number: EK-1909S21R) produced by DAIKIN INDUSTRIES, LTD. for a foundation layer and top paint (model number: EK-3700C21R) produced by DAIKIN INDUSTRIES, LTD. for a second fluororesin layer. The primer paint and the top paint were dried in a thermostatic bath set to 90° C. for 30 minutes and thereafter calcined for 30 minutes in a heating furnace set to 380° C. Thereafter specimens were irradiated with electron beams to allow the indentation hardness of the surface of each sliding layer to have a predetermined hardness shown in table 2. The specimen of the comparative example 5 was not irradiated with the electron beams. The specimen of the comparative example 6 had an indentation hardness exceeding 85 MPa. The specimen of the comparative example 7 and that of the comparative example 2 showed the same result. In the specimens of the comparative examples 7 and 2, at the stage of calcining the sliding film, crack occurred. Thus the irradiation of the electron beams and the evaluation test were discontinued. In the specimen of the comparative example 8, without forming the foundation layer, the second fluororesin layer was formed directly on a metal base material by using the coating liquid identical to those of the examples and in the conditions identical to those of the examples. Thereafter the second fluororesin layer was irradiated with the electron beams to allow the indentation hardness of the surface of the sliding layer to have the same indentation hardness as that of the surface of the sliding layer of the example 9. In the specimen of the comparative example 9, the surface of a cage, for a needle bearing, made of quenched and tempered chromium-molybdenum steel (SCM415) having a diameter of ϕ 44 mm and a width of 22 mm was silver-plated. The specimen of the comparative example 9 and that of the comparative example 4 showed the same result.

The wear amount of each surface-treated cage for a needle bearing and a lubricating oil immersion test were evaluated by the same method as that of the example 1. Table 2 shows the results.

The indentation hardness of each of the obtained flat plate specimens was measured in a method conforming to ISO14577 by using a nanoindenter (G200) produced by Agilent Technologies, Inc. Each of the measured values shows an average value of depths (portion where hardness was stable) not affected by the surface roughness and the base material (SPCC). The indentation hardness of each specimen was measured at 10 portions. The measuring conditions were as follows: The configuration of the indenter was of a Berkovich type; a depth indentation was measured when a load of 5 mN was applied to each specimen; a load application speed was 10 mN/minute; and a measuring temperature was 25° C. Each indentation hardness was calculated from an indentation load and a displacement (area).

TABLE 2

|  | Example | | | | Comparative example | | | | |
| --- | --- | --- | --- | --- | --- | --- | --- | --- | --- |
|  | 8 | 9 | 10 | 11 | 5 | 6 | 7 | 8 | 9 |
| Material of sliding layer | PTFE | PTFE | PTFE | PTFE | PTFE | PTFE | PTFE | PTFE ※ 2) | Silver plating |
| Indentation hardness of sliding layer, MPa | 60 | 80 | 85 | 80 | 45 | 95 | — | 80 | — |
| Thickness of sliding layer, μm | 20 | 20 | 20 | 10 | 20 | 20 | 40 | 20 | 20 |
| Wear amount, μm | 7 | 10 | 8 | 8 | 20 | 8 | Untestable | ※3) | 12 |
| Peel-off amount | Small | Small | Small | Small | — | Large | Untestable | ※3) | Small |
| Elution amount in immersion test, ppm | 0 | 0 | 0 | 0 | 0 | 0 | 0 | 0 | 600 |

※ 2) Without forming the foundation layer, the second fluororesin layer was formed directly on the base material.
※ 3) Peeling occurred in the vicinity of the base material. Thus the test was discontinued.

Examples 12 Through 15 and Comparative Examples 10 Through 14

A cage (surface hardness of base material: Hv: 484 to 595), for a needle bearing, made of quenched and tempered chromium-molybdenum steel (SCM415) having a diameter of ϕ 44 mm and a width of 22 mm was prepared. A sliding layer was formed by using the primer paint (model number: EK-1909S21R) produced by DAIKIN INDUSTRIES, LTD. for a foundation layer and the top paint (model number: EK-3700C21R) produced by DAIKIN INDUSTRIES, LTD. for a second fluororesin layer. Each sliding layer was dried in the thermostatic bath set to 90° C. for 30 minutes and thereafter calcined for 30 minutes in the heating furnace set to 380° C. Thereafter specimens were irradiated with electron beams to allow the melting point of each film to have a predetermined temperature shown in table 1. The specimen of the comparative example 10 was not irradiated with the electron beams. In the specimen of the comparative example 12, at the stage of calcining the sliding film, crack occurred. Thus the irradiation of the electron beams and the evaluation test were discontinued. In the specimen of the comparative example 13, without forming the foundation layer, the second fluororesin layer was formed directly on the iron-based metal material by using the coating liquid identical to those of the examples and in the conditions identical to those of the examples. Thereafter the second fluororesin layer was irradiated with the electron beams to allow the melting point of the sliding layer to have the same melting point as that of the sliding layer of the example 13. In the specimen of the comparative example 14, the surface of a cage, for a needle bearing, made of quenched and tempered chromium-molybdenum steel (SCM415) having a diameter of ϕ 44 mm and a width of 22 mm was silver-plated. The specimen of the comparative example 14 and that of the comparative example 4 showed an identical result.

The melting point was measured by using a differential scanning calorimeter (produced by SII Nanotechnology Inc., product name: "DSC6220"). As a measured specimen, 10 to 15 mg of a fluororesin film enclosed in a specimen container made of aluminum (hereinafter referred to as aluminum pan) produced by SII Nanotechnology Inc. was used. As a reference, aluminum oxide ($Al_2O_3$), enclosed in the aluminum pan, whose amount was equal to that of the fluororesin film was used. Regarding the measuring condition, at the rate of temperature rise of 2° C./minute in an atmosphere where nitrogen flowed (200 mL/minute), the temperature was raised from 30° C. to 370° C. After the temperature was kept at 370° C. for 20 minutes, the temperature was lowered from 370° C. to 40° C. The peak top of the endothermic peak when the temperature was raised was set as the melting peak temperature, namely, the melting point.

The wear amount of each surface-treated cage for a needle bearing and a lubricating oil immersion test were evaluated by the same method as that of the example 1. Table 3 shows the results.

TABLE 3

|  | Example | | | | Comparative example | | | | |
| --- | --- | --- | --- | --- | --- | --- | --- | --- | --- |
|  | 12 | 13 | 14 | 15 | 10 | 11 | 12 | 13 | 14 |
| Material of sliding layer | PTFE | PTFE | PTFE | PTFE | PTFE | PTFE | PTFE | PTFE ※2 | Silver plating |
| Melting point, ° C. | 301 | 284 | 272 | 284 | 321 | 258 | 321 | 284 | — |
| Thickness of sliding layer, μm | 20 | 20 | 20 | 10 | 20 | 20 | 40 | 20 | 20 |
| Wear amount, μm | 7 | 10 | 8 | 8 | 20 | 8 | Untestable | ※3 | 12 |
| Peel-off amount | Small | Small | Small | Small | — | Large | Untestable | ※3 | Small |
| Elution amount in immersion test, ppm | 0 | 0 | 0 | 0 | 0 | 0 | 0 | 0 | 600 |

※2) Without forming the foundation layer, the second fluororesin layer was formed directly on the base material.
※3) Peeling occurred in the vicinity of the base material. Thus the test was discontinued.

INDUSTRIAL APPLICABILITY

According to the present invention, it is possible to obtain the sliding member which can be restrained from wearing even in the presence of lubricating oil and under conditions of a high sliding speed and a high contact pressure. Therefore the sliding member of the present invention can be used for the cage, made of the iron-based metal material, which is used in the oil lubrication environment and for the rolling bearing having this cage.

EXPLANATION OF REFERENCE NUMERALS AND SYMBOLS

1: cage
2: pocket
3: pillar part
4: annular portion
5: annular portion
6: needle roller bearing
7: needle roller
8: inlet pipe
9: exhaust pipe
10: combustion chamber
11: piston
12: crankshaft
13: connecting rod
14: rotational central axis
15: balance weight
16: big end portion
17: small end portion
18: piston pin
19: concave mating member
20: load

The invention claimed is:

1. A sliding member which is used under an oil lubrication environment and has a sliding layer formed on an iron-based metal material, wherein said sliding layer is made by forming a foundation layer comprising heat-resistant resin and a first fluororesin on a surface of said iron-based metal material; forming a second fluororesin layer on a surface of said foundation layer; and after said foundation layer and said second fluororesin layer are calcined, irradiating with radiation rays said second fluororesin layer, wherein said heat resistant resin is at least one resin selected from the group consisting of epoxy resin, polyester resin, amide-imide resin, imide resin, ether imide resin, imidazole resin, polyethersulfone resin, polysulfone resin, polyether etherketone resin and silicone resin; said heat-resistant resin does not thermally decompose when said foundation layer and said second fluororesin layer are calcined; and
wherein said second fluororesin layer consists of polytetrafluoroethylene resin; and said second fluororesin layer is irradiated with said radiation rays in a condition in which said second fluororesin layer is crosslinked.

2. A sliding member according to claim 1, wherein as a condition in which said second fluororesin layer is crosslinked, an irradiation temperature is in a range from a temperature lower than the melting point of the second fluororesin layer by 30° C. to a temperature higher than the melting point thereof by 20° C.; and an irradiation dose is more than 250 kGy and not more than 750 kGy.

3. A sliding member according to claim 1, wherein said radiation rays are electron beams.

4. A sliding member according to claim 1, wherein the second fluororesin, as compared with uncrosslinked polytetrafluoroethylene resin, shows a solid $^{19}F$ Magic Angle Spinning (MAS) Nuclear Magnetic Resonance (NMR) chart where in addition to −82 ppm, −122 ppm, −126 ppm of said uncrosslinked polytetrafluoroethylene resin, at least one chemical shift value (δ ppm) selected from among −68 ppm, −70 ppm, −77 ppm, −80 ppm, −109 ppm, −112 ppm, −152 ppm, and −186 ppm appears or a signal intensity of a signal of a chemical shift value appearing at −82 ppm is higher than a signal intensity of said uncrosslinked polytetrafluoroethylene resin.

5. A sliding member according to claim 1, wherein a thickness of said sliding layer is not less than 5 μm and less than 40 μm.

6. A cage, made of an iron-based metal material, for retaining rolling elements of a rolling bearing, wherein said cage made of said iron-based metal material is formed of a sliding member according to claim 1; and an indentation hardness of a sliding layer irradiated with radiation rays measured in conformity to ISO14577 is 52 to 90 MPa.

7. A cage, made of an iron-based metal material, for retaining rolling elements of a rolling bearing, wherein said cage made of said iron-based metal material is formed of a sliding member according to claim 1; and a melting point of said second fluororesin layer irradiated with radiation rays is 265 to 310° C.

8. A rolling bearing having a cage made of an iron-based metal material according to claim 6.

9. A rolling bearing according to claim 8 which is used as a rolling bearing for a bid end portion of a connecting rod of an engine, a rolling bearing for a small end portion of said connecting rod thereof or a rolling bearing for a crankshaft-supporting shaft.

10. A rolling bearing having a cage made of an iron-based metal material according to claim 7.

\* \* \* \* \*